Jan. 22, 1929. 1,699,800
C. A. MICHEL
COMBINED TAIL LAMP, STOP SIGNAL, AND REVERSE LIGHT
Filed Jan. 10, 1923 2 Sheets-Sheet 1
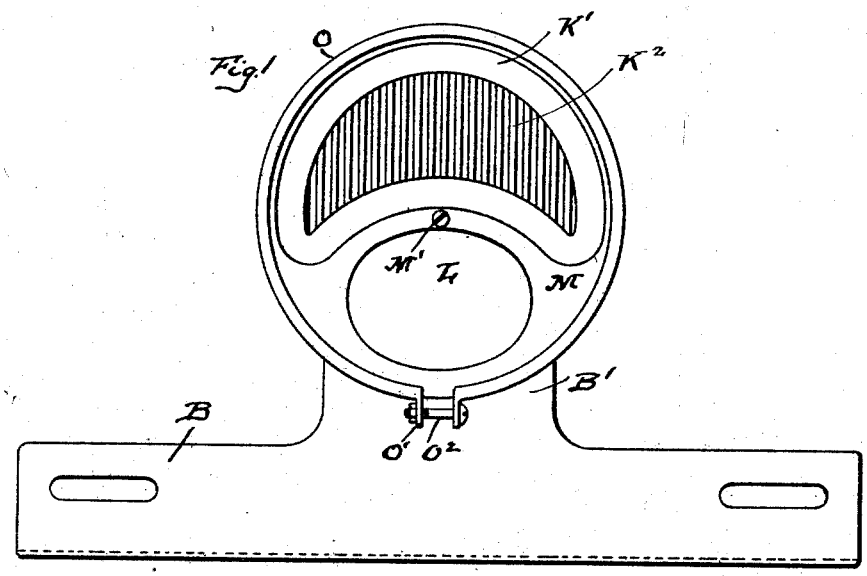
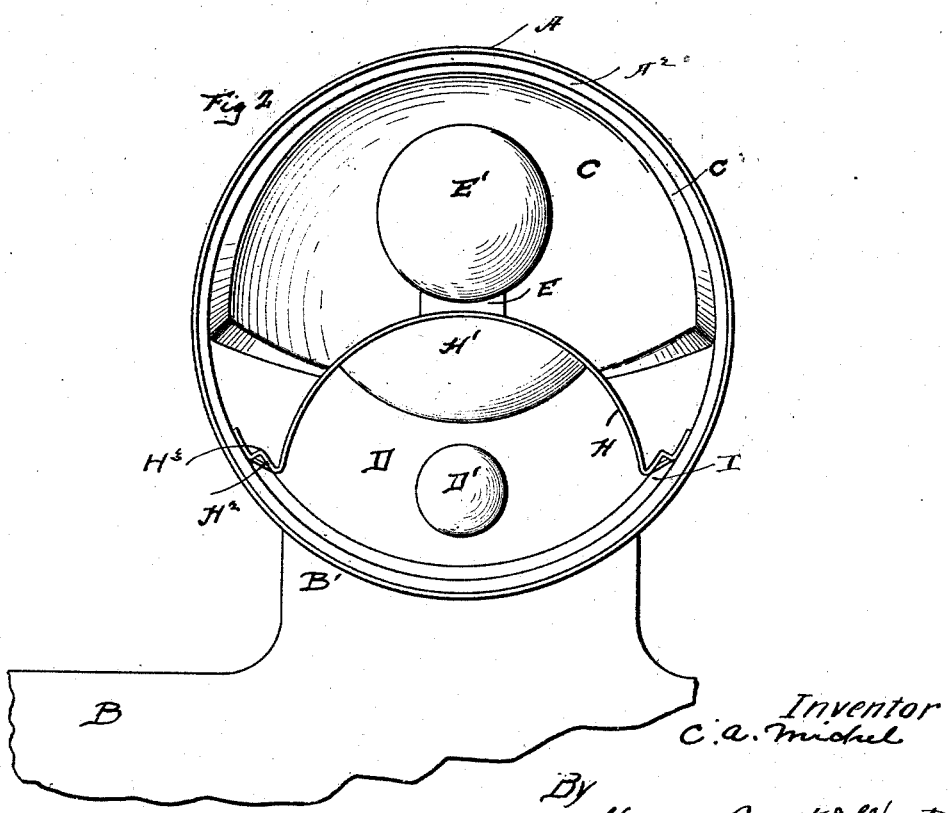

Jan. 22, 1929. 1,699,800
C. A. MICHEL
COMBINED TAIL LAMP, STOP SIGNAL, AND REVERSE LIGHT
Filed Jan. 10, 1923 2 Sheets-Sheet 2
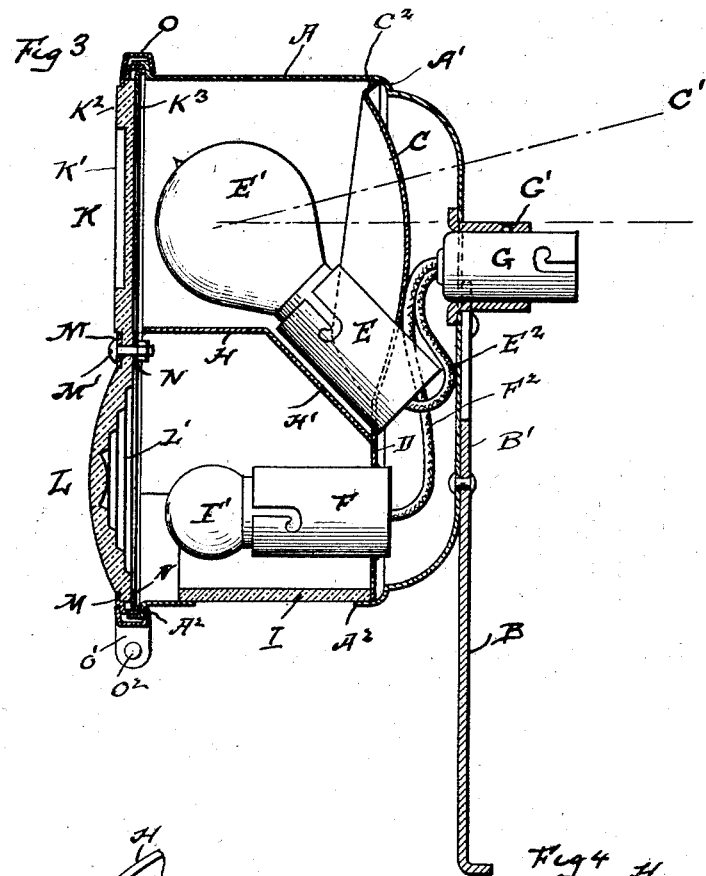
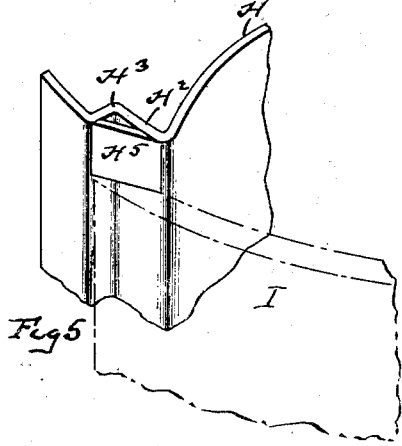
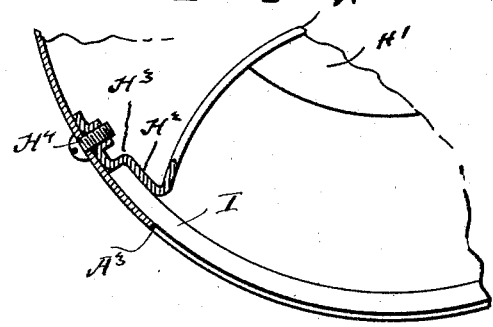
Inventor
C. A. Michel
By Hull Brock & West
Attys.

Patented Jan. 22, 1929.

1,699,800

UNITED STATES PATENT OFFICE.

CLARENCE A. MICHEL, OF CLEVELAND, OHIO, ASSIGNOR TO THE GUIDE MOTOR LAMP MANUFACTURING COMPANY, OF CLEVELAND, OHIO, A CORPORATION OF OHIO.

COMBINED TAIL LAMP, STOP SIGNAL, AND REVERSE LIGHT.

Application filed January 10, 1923. Serial No. 611,728.

This invention relates generally to tail lamps for automobiles and more particularly to a combined tail lamp, stop signal and reverse or backing lamp.

All automobiles require a tail lamp and it is desirable to also have a rear end stop signal which is illuminated when the vehicle is stopped or the speed thereof checked in order to give a signal to an automobile in the rear thereof, and it is also desirable when backing an automobile to have sufficient illumination in the rear thereof for the operator of the automobile to see where the machine is being backed.

The object of my invention therefore is to combine all three of these lamps into a single unitary structure and provide a neat and simple device which can be arranged exactly the same as the ordinary tail lamp and which will serve the three functions before outlined.

Another object of the invention is to utilize one portion of the lamp as a combined stop signal and reverse light and another object of the invention is to so construct the combined stop signal and reverse light that the rays of light will be projected rearwardly and downwardly so as to provide the greatest amount of illumination at the rear of the vehicle when the same is being backed.

Another object of the invention is to provide a combination device of a character described and in which the incandescent lamps will be conveniently arranged and to which access can be quickly and easily had when desired.

Another object of the invention is to provide a glass outlook in connection with the lamp casing and a still further object is to so construct and arrange the several parts that all of them will be securely held in position and all rattling prevented.

With these various objects in view the invention consists in the novel features of construction, and the manner in which they are combined or arranged, all of which will be fully described hereinafter and set forth in the appended claims.

In the drawings forming a part of this specification,

Figure 1 is a face view of a combined tail lamp, stop signal and reverse light constructed in accordance with my invention;

Figure 2 is a similar view with the glass front removed and exposing the incandescent lamps, the reflector and sub-dividing partition arranged in the casing;

Figure 3 is vertical longitudinal sectional view;

Figure 4 is an enlarged detailed sectional view showing the manner of connecting the sub-dividing partition and fastening for the outlook glass; and Figure 5 is a detailed perspective view of such parts.

In carrying out my invention I employ a substantially cylindrical casing A which is closed at the rear side and is preferably connected to the upwardly extending portion $B'$ of a combined lamp and license bracket or plate B. The casing is rounded slightly where the cylindrical portion joins the rear closed side and in practice I prefer to form this portion with an inwardly projecting annular shoulder $A'$. The outer edge of the casing is shouldered outwardly as indicated at $A^2$ and in the bottom of the casing there is cut an opening $A^3$ through which light can be projected for the purpose of illuminating the license plate attached to the plate or bracket B. Within the casing and preferably abutting against the internal annular shoulder $A'$ is a combined reflector and socket carrier, the upper portion C being a section of a parabola whose axis of revolution is inclined to the horizontal as indicated by the line $C'$.

The lower portion D is straight as most clearly shown in Figure 3. The upper portion C has the socket sleeve E connected thereto and the lower portion D has the socket sleeve F connected thereto, the sleeve E being arranged inclined as shown and carrying the incandescent lamp $E'$ while the socket F is arranged horizontal and carries the incandescent lamp $F'$ therein.

A socket connection G is arranged in a sleeve $G'$ fixed to the rear side of the casing and from which lead the wires $E^2$ and $F^2$ respectively to the sockets E and F and it will be noted that all of these connections are arranged at the rear of the reflector and consequently concealed from view when the front of the casing is removed.

The casing is subdivided into an upper and lower portion by means of a partition H which is substantially semi-circular in shape, its side edges contacting with the inner sides of the casing below the horizontal medio line and the central rear portion of the partition is bent downwardly as shown at H' in order to provide ample space for the positioning of the socket E in the inclined position as shown in Figure 3.

The sides or ends of the partition H are bent back as shown at H² and shouldered at H³ and secured to the casing by means of screws or bolts H⁴. The shoulder H³ is provided for the engagement of the end of the curved outlook glass I, this glass being arranged over the opening A³ and the ends thereof contact with the shouldered portions of the partition and are securely held in place and is further held against movement by means of the cross pieces H⁵ connected to the upset ends of the partition as most clearly shown in Figure 5.

The partition H when secured to the casing maintains the combined reflector and socket carrier in its proper position and if desired, the rear edges of the partition may be soldered or otherwise connected to the reflector. The upper portion C of the reflector is slightly inclined as indicated and consequently this upper portion is provided with a rearwardly projecting flange C² for contact with the interior annular shoulder A'.

The casing is closed by means of a glass front which comprises an upper portion K and a lower portion L and these upper and lower portions can be in one piece or separate pieces as preferred. The glass front whether composed of one piece or two pieces is held between the outer frame plate M and the inner frame plate N and these frame plates with the red glass or glasses held therebetween are fitted into the shouldered edge A² of the casing and secured to said casing through the medium of the divided channeled ring O, the ends thereof being upset as indicated at O' and through which a fastening screw O² is passed for the purpose of binding the channeled ring upon the edges of the casing and the frame plates.

The lower glass L is lenticular in form and has its inner face preferably formed with refracting prisms or portions L'. This glass is arranged in line with the lower incandescent lamp F' and serves as the ordinary tail lamp, this lamp being continuously illuminated when the switch is turned on. The lamp E' is connected with the switch which is operatively connected with the brake or clutch so that it will be illuminated when the vehicle is stopped or the speed thereof checked and this lamp E' will also be connected with a switch which can be turned on when lever is shifted into reverse when the vehicle is being reversed or backed for the purpose of lighting up the space directly at the rear of the vehicle.

In order that the upper portion of the lamp can be utilized both as a stop signal and as a reverse light, the upper glass K is constructed in a peculiar manner and in my application of even date herewith, I have shown several forms of glasses which can be employed. In the present instance, the outer face of the central portion of the glass is formed with parallel vertical prisms K' while the surrounding border K² is flat but the inner face of the surrounding border portion is stippled as indicated at K³.

By constructing the upper glass in this manner I provide for the lateral distribution of light by means of the prisms K' and by means of the stippled inner face of the border portion, I provide for the brilliant illumination of such border portion which serves as a stop signal when the lamp is cut in upon the stoppage of the vehicle or the checking of the speed thereof.

When the lamp E' is lighted, there is not only lateral distribution of the light but also owing to the inclination of the reflector, the rays of light are directed downwardly and rearwardly through the glass inasmuch as the incandescent lamp is preferably placed at the focal point of the reflector as most clearly shown in Figure 3.

It will also be understood that the lamp E' is of considerably greater candle power than the lamp F' which is continuously illuminated and serves as the ordinary tail lamp.

It will thus be seen that I provide a very simple form of combination lamp embodying the ordinary tail lamp, a stop signal and a reverse or backing light and that the various parts are so constructed and arranged as to be quickly and easily placed within the casing and when once secured will be held against rattling and it will also be noted that the reflector serves the purpose of carrying the sockets for the lamps and also conceals the wiring and the sub-dividing partition also serves to hold the reflector in place and likewise the curved outlook glass and in this connection attention is called to the fact that I am able to employ a curved piece of glass in contra-distinction to the strips of celluloid or other translucent material heretofore employed to cover the outlook opening.

Instead of employing the inner and outer frame plates M and N and the clamping ring O, I may form the outer frame plate with an inwardly projecting annular flange which fits upon a flanged portion of the casing and the frame in this instance will be secured to the casing through the medium of screws passing through the sides of the frame into threaded lugs attached to the casing or the partition.

By carrying the front glass or glasses between the outer and inner plates connected together by the central screw M', I provide a simple and efficient means for positioning the glass within the open end of the casing as the outer edges of the glass or glasses are held between the outer metallic portions of the frame plates, the inner plate N preferably fitting into the outer plate M as shown and both in turn securely clamped to the casing through the medium of the channeled clamping ring O.

What I claim is:—

1. In a device of the kind described, a casing having an opening in the bottom thereof, a curved glass covering said opening and a partition arranged in said casing and subdividing the same, the ends of said partition being secured to the sides of the casing, the edges of said partition being bent back and shouldered to receive the ends of the curved outlook glass and cross pieces connected to the shouldered portions of the partition and holding the glass against movement.

2. A device of the class described comprising a casing, a reflector arranged within said casing, a partition extending across said casing and dividing the same into a plurality of compartments, said casing having an opening in its bottom, a curved outlook glass positioned over said opening, said partition having its opposite ends secured to the side walls of said casing and overlying said outlook glass for holding the same in place, the rear central portion of said partition being bent downwardly and bearing against said reflector and serving to hold the same against displacement.

3. A device of the class described comprising an open ended casing having an inwardly projecting shoulder thereon, a reflector arranged within said casing and abutting said shoulder, a partition extending across said casing and dividing the same into a pair of compartments, said partition being secured to said casing and having a bent portion contacting with said reflector and holding the same against displacement, an outlook glass positioned over an opening in the bottom of said casing, said partition having a portion engaging said outlook glass and holding the same in place, a lamp socket in each of said compartments and a transparent cover secured over the open end of said casing.

In testimony whereof, I hereunto affix my signature.

CLARENCE A. MICHEL.